United States Patent
Anderson et al.

(10) Patent No.: US 9,098,719 B2
(45) Date of Patent: Aug. 4, 2015

(54) SECURING UNRUSTED CONTENT FOR COLLABORATIVE DOCUMENTS

(75) Inventors: John Aaron Anderson, San Francisco, CA (US); Andrew John Nesbitt, London (GB)

(73) Assignee: Apple Inc., Cupertino, CA (US)

( * ) Notice: Subject to any disclaimer, the term of this patent is extended or adjusted under 35 U.S.C. 154(b) by 488 days.

(21) Appl. No.: 13/020,755

(22) Filed: Feb. 3, 2011

(65) Prior Publication Data

US 2012/0204250 A1 Aug. 9, 2012

(51) Int. Cl.
*G06F 21/00* (2013.01)
*G06F 21/62* (2013.01)
*G06Q 10/10* (2012.01)
*H04L 29/06* (2006.01)
*G06F 21/53* (2013.01)

(52) U.S. Cl.
CPC ............ *G06F 21/6218* (2013.01); *G06F 21/53* (2013.01); *G06Q 10/107* (2013.01); *H04L 63/0807* (2013.01); *H04L 63/18* (2013.01); *H04L 63/0838* (2013.01); *H04L 63/1441* (2013.01)

(58) Field of Classification Search
CPC ........................ H04L 63/0807; G06F 21/6218
USPC ........................ 726/9; 713/170; 715/205, 225
See application file for complete search history.

(56) References Cited

U.S. PATENT DOCUMENTS

| | | | | |
|---|---|---|---|---|
| 6,839,760 | B1 * | 1/2005 | Walters .......................... | 709/229 |
| 7,013,289 | B2 * | 3/2006 | Horn et al. .................. | 705/14.51 |
| 7,240,192 | B1 * | 7/2007 | Paya et al. ...................... | 713/152 |
| 7,444,678 | B2 * | 10/2008 | Whitmer et al. ................. | 726/22 |
| 7,478,434 | B1 * | 1/2009 | Hinton et al. .................... | 726/27 |
| 8,150,736 | B2 * | 4/2012 | Horn et al. .................... | 705/26.1 |
| 2007/0055739 | A1 * | 3/2007 | Marmor ........................ | 709/217 |
| 2008/0005284 | A1 | 1/2008 | Ungar et al. | |
| 2008/0120533 | A1 * | 5/2008 | Lazier et al. .................. | 715/234 |
| 2008/0244740 | A1 * | 10/2008 | Hicks et al. ...................... | 726/22 |
| 2009/0055460 | A1 * | 2/2009 | Hicks et al. .................... | 709/201 |
| 2009/0112678 | A1 | 4/2009 | Luzardo | |
| 2011/0307955 | A1 * | 12/2011 | Kaplan et al. .................... | 726/23 |

OTHER PUBLICATIONS

Barth et al.; Robust defenses for cross-site request forgery; Published in: Proceeding CCS '08 Proceedings of the 15th ACM conference on Computer and communications security; 2008; pp. 75-88; ACM Digital Library.*

Ofuonye et al.; Resolving JavaScript Vulnerabilities in the Browser Runtime; Published in: Software Reliability Engineering, 2008. ISSRE 2008. 19th International Symposium on Date of Conference: Nov. 10-14, 2008; pp. 57-66; IEEE Xplore.*

Sergio Maffeis, et al., "Object Capabilities and Isolation of Untrusted Web Applications", 2010 IEEE Symposium on Security and Privacy, 2010, pp. 125-140.

* cited by examiner

*Primary Examiner* — Bradley Holder
(74) *Attorney, Agent, or Firm* — Blakely, Sokoloff, Taylor & Zafman LLP

(57) ABSTRACT

A method and an apparatus that configure a sandbox document for secure presentation of a block of data stored in the sandbox document in response to an editing request from a client are described. A presentable content corresponding to a document may be sent to the client for editing. The document and the sandbox document may be separately addressable by separate paths of separate domains. The editing request may include the block of data to update the presentable content of the document. The updated presentable content may include a hyperlink to the sandbox document. The edited document and the sandbox document may allow secure presentation of the block of data within the updated presentable content of the edited document without a need to filter the block of data.

13 Claims, 7 Drawing Sheets

SECURING UNRUSTED CONTENT FOR COLLABORATIVE DOCUMENTS

FIELD OF INVENTION

The present invention relates generally to collaborative document editing. More particularly, this invention relates to ensuring security for untrusted content in collaboratively edited documents.

BACKGROUND

In a collaborative editing environment where scripting is enabled (e.g. via JavaScript), there are a number of ways that a malicious attacker can place well-constructed content on a content page, such as a publicly shared wiki document or wiki page. For example, a hidden script embedded in the content page may steal the currently logged-in user's authentication token, or lead the user to unknowingly perform actions where a script masquerades itself as a built-in feature of the content page (e.g. "clickjacking").

Typically, when storing a wiki page in a server for sharing with wiki users, a security measure may be performed to strip any malicious looking scripts or texts of dubious styles from the wiki page to prevent security risks. However, there may be a genuine need to place scripts on wiki pages for non-malicious reasons, such as allowing multimedia content presentation.

Therefore, traditional approaches for collaborative document editing do not provide a secure manner to accommodate evolving types of active content.

SUMMARY OF THE DESCRIPTION

An architecture to configure multiple documents for a presentable content can allow users to place unrestricted types of contents in the documents while protecting a client device which presents the presentable content. The presentable content may be a web page created in a collaborative document editing environment. Raw contents dynamically received from a user may be stored without filtering in a sandbox document within the architecture. A sandbox block placed in the presentable content may be hyperlinked with the sandbox document. When the client device presents the presentable content, the sandbox block may cause a security mechanism to prevent active content from the sandbox document to compromise operations of the client device. Thus, sandbox blocks can allow embedding untrusted markup on a collaboratively created document (e.g. a wiki page) to maintain the ability to execute active content (e.g. JavaScript based codes) from the untrusted markup that is not known to be secure.

An embodiment of the present invention includes methods and apparatuses that configure a sandbox document for secure presentation of a block of data stored in the sandbox document in response to an editing request from a client. A presentable content corresponding to a document may be sent to the client for editing the document with the block of data. The document and the sandbox document may be separately addressable by separate paths of separate domains. The editing request may include the block of data to update the presentable content of the document. The updated presentable content may include a hyperlink to the sandbox document. The edited document and the sandbox document may allow secure presentation of the block of data within the updated presentable content of the edited document without a need to filter the block of data.

In another embodiment, a dynamic hyperlink may be generated for a presentable content corresponding to a document of a first domain in response to receiving a request addressing the document. The dynamic hyperlink may address a sandbox document in a second domain separate from the first domain. The validity of the dynamic hyperlink may be indicated by a first token included in the hyperlink. The presentable content may include the dynamic hyperlink for the request. In one embodiment, a second token from a server of the second domain may be received to verify if the first token and the second token match. A validation message may be sent to the server to indicate whether the second token is valid depending on whether the first and second token match. The validity of the second token may allow secure presentation of the sandbox document for the presentable content.

In yet another embodiment, an active document may be remotely received via a first request of a first domain. The active document may be dynamically stored without filtering in a second domain. In one embodiment, a second request may be received addressing the active document of the second domain. A token may be extracted from the second request. The token may uniquely identify the second request. The validity of the second request may be verified according to the token. The active document may be transmitted for the second request to allow secure activation of active content in the active document if the validity of the second request is verified.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
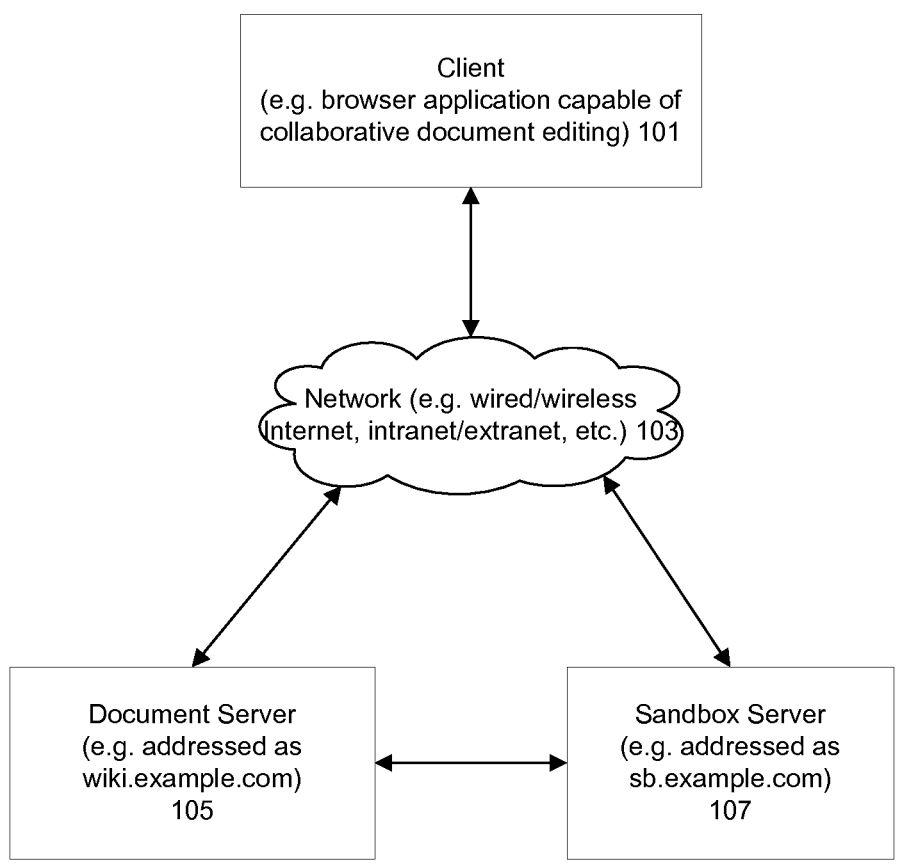
FIG. 1 is a block diagram illustrating one embodiment of networked systems for collaborative document editing.

Methods and apparatuses for securing untrusted content for collaborative documents are described herein. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g. circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

In one embodiment, raw markup data, such as based on HTML (Hypertext Markup Language), may be designated as a sandbox block to edit a web page (e.g. a wiki page) served from a server. An editor may save the designated sandbox block to the server with a flag indicating the block as "not to be sanitized". As a result, the server may save the raw markup content to a special path on the server without removing, for example, scripts and/or other potentially malicious content, from the designated sandbox block. When the edited web page is served up to any user, the raw markup content of the designated sandbox block may be retrieved from the server out-of-band from the rest of the web page, for example, based on a separate path and port, e.g. in a separate domain.

In one embodiment, a web page may be a container page including a sandbox block to retrieve unsecured content out-of-band from the container page. Private data within the context of the container page may not be accessible or read for content within the sandbox block. Context based private data may settings, session identifiers, passwords, user data, authentication information or other related data, for example, carried in cookies for the container page.

In certain embodiments, content (e.g. attachments or other resources) dynamically stored in a server for a sandbox block may be retrieved limited by a one-time-use authentication token. Multiple sandbox blocks may appear in one presentable content (or web page) corresponding to a document stored in a server serving the presentable content. Each sandbox may be associated with a separate and unique token.

A server configured with untrusted content for a sandbox block may reject a request for the content if the request does not include a valid token according to a verification mechanism. For example, a one-time-use token may be a unique token dynamically generated for one single request without possibility of being reused. In one embodiment, the one-time-use token may be handled out-of-band from a web page embedding the token in a hyperlink. As soon as when the one-time-use toke is presented and verified in the server, the token may be invalidated or revoked to prevent it from being used a second time. As a result, effects of presentation or execution of untrusted content for a sandbox block can be safely contained within secure and trusted content of its container page.

In one embodiment, a web browser running in a client device may be remotely connected to a wiki server running in a server device serving a wiki page for a wiki document which can be edited collaboratively from multiple clients at the same time. Each client may upload untrusted content to be presented unfiltered with the wiki page for the edited wiki document. A server component in the wiki server may allow the untrusted content to be securely presented within a wiki document for each client device. The wiki server may be configured with active content for an external site (e.g. of a separate domain) to allow the wiki server to serve the untrusted content indirectly via the external site. Thus, every user of the wiki document is free to post third party content unfiltered or unchanged in the wiki server to share collaboratively with other users.

FIG. 1 is a block diagram illustrating one embodiment of networked systems for collaborative document editing. Networked systems 100 may include one or more servers, such as servers 105, 107, coupled to one or more clients, such as client 101, via networks 103. A client may be a browser application running in a client device. Servers 105, 103 may be hosted by one single server device (or server machine) or separate server devices. In one embodiment, network 103 may allow communication channels or network connections to be established between servers 105, 107 and client 101 via the open Internet, an intranet, firewall protected secure networks, wide area cellular networks (e.g. a 3G network), or other applicable networks, etc. Networks 103 may be wired, wireless (such as Wi-Fi, Bluetooth etc), or a combination of both.

Client 101 may be a browser application capable of performing transactions for presenting and/or editing remotely hosted documents, such as wiki documents in a wiki server. Multiple clients may collaboratively edit one single document. For example, client 101 may send an untrusted content to a wiki server to update a wiki document. Another client may retrieve the untrusted content not filtered from the wiki server when viewing the updated wiki document from the wiki server.

In one embodiment, document server 105 may reside in a network address within a domain, such as "wiki.example.com". Sandbox server 107, however, may reside in a separate network address in a separate domain, such as "sb.example.com". Separate servers 105, 107 may be different processes hosted in one server device using different ports to serve collaborative content or web pages. Alternatively, document server 105 and sandbox server 107 may be hosted by separate server devices. Client 101 may request a document in-band (e.g. within a common domain) from document server 105. The document requested may include a block for an untrusted content dynamically installed via document server 105. In one embodiment, sandbox server 107 may interact with document server 105 to send the untrusted content out-of-band to client 101 for presenting the requested document.

Figure 2:
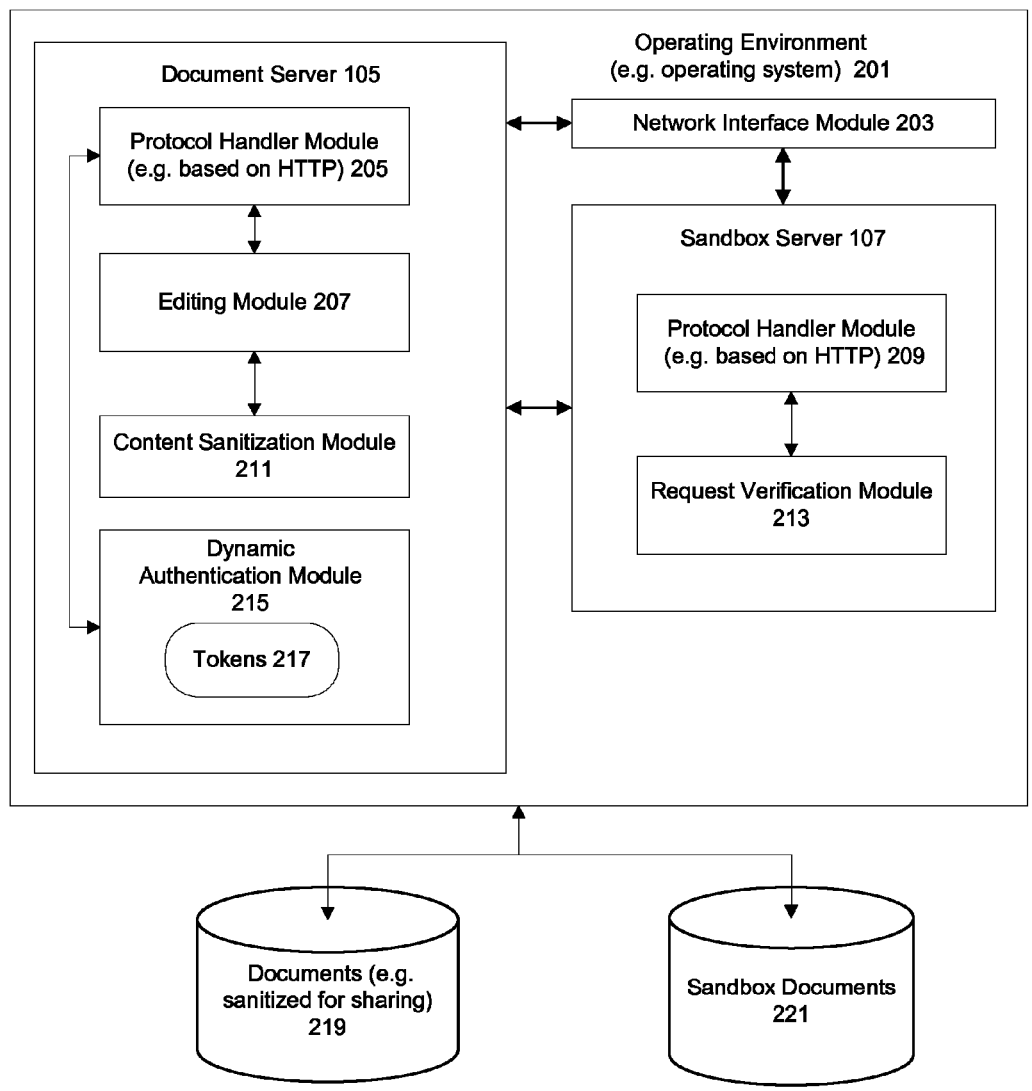
FIG. 2 is a block diagram illustrating an exemplary system to enable sandbox for secure presentation of untrusted external documents to embodiments described herein.

FIG. 2 is a block diagram illustrating an exemplary system to enable a sandbox for secure presentation of untrusted external documents according to embodiments described herein. A sandbox may be a security mechanism for separating running programs, for example to execute untested code, or untrusted programs from unverified third-parties, suppliers and untrusted users. In one embodiment, operating environment 201 in a single server device may support multiple servers, such as document server 105 and sandbox server 107 of FIG. 1. Both servers 105, 107 may be capable of supporting standard HTTP (Hypertext Transfer Protocol) protocol or other transfer protocols, e.g. via protocol handler modules 205, 203, for serving documents to standard web browsers or other applicable document readers/editors in client devices.

In one embodiment, document sever 105 and sandbox server 107 may share a common network interface, such as via network interface module 203, of a server device. Network interface module 203 may be associated with a network address (e.g. an IP address) assigned to the device. In one embodiment, servers 105, 107 may be based on separate processes associated with different ports in operating environment 201. Two separate domains, such as "wiki.example.com" and "sb.example.com" may be registered to map to the separate ports of servers 105, 107 via the same network address for network interface module 203. Thus, a request, such as URLs (Uniform Resource Locator) request, with a path addressing a resource (or a document) in a domain may be directed to a target server, e.g. document server 105 or sandbox server 107, based on the domain.

Document server 105 may be a web server capable of serving wiki pages from documents 219. A wiki page may be a web page based on hypertext documents that allow easy creation and editing of any number of interlinked web pages via a web browser using a simplified markup language or a WYSIWYG (what you see what you get) text editor. Protocol handler module 205 may receive an HTTP request from a web browser to retrieve a wiki page from documents 219. Alternatively, protocol handler module 205 may pass a request to editing module 207 if the request is recognized as an edit request (e.g. based on certain characteristics of paths or data associated with the request) for performing editing operations for documents stored in documents 219. An edit operation may be related to updating a wiki page, adding a wiki page, removing a wiki page or other applicable operations.

In one embodiment, edit module 207 may perform edit operations for a received edit request. Edit module 207 may determine if an edit request carries or posts data to update an existing wiki page or adds a new wiki page to documents 219 for sharing with other clients (or users). To ensure security, edit module 207 may sanitize data posted from the edit request via content sanitization module 211 prior to performing editing changes on documents 219 for the edit request. For example, content sanitization module 211 may strip active content, such as executable scripts or commands, from the posted data. Examples of executable scripts may include JavaScript, Jscript, ActiveX™ codes, Java codes, or other applicable executable codes.

In some embodiments, a block of data, such as posted data from an edit request, may be flagged to indicate that the block of data should be presented to clients in its raw content format without filtering, stripping or other modification. For example, an edit request received from an editor or browser may include a special flag associated with a block of data embedded with scrip codes for a multimedia link, such as YouTube™ video link, to be posted in a wiki page. Edit module 207 may determine not to sanitize a block of data posted with the special flag from a request received. Instead, edit module 207 may configure server devices to ensure a sandbox mechanism is activated in a device to present raw content from the block of data.

For example, edit module 207 may generate a code template for a block of data posted in an edit request to update a target document in documents 219 addressed in the request. The block of data may be stored as raw content without changes in sandbox document 221 addressed via a sandbox server 107. In one embodiment, protocol handler module 205 may dynamically generate code via the code template in the target document to serve a wiki page for the target document. The dynamically generated code may include a hyperlink linking the block of data stored in sandbox documents 221 in the wiki page. The dynamically generated code may be based a frame element, such as an IFRAME tag of HTML language, which may activate a sandbox mechanism in a client application via a same origin policy which can limit content executed within IFRAME tag to access data within one single domain. For example, JavaScript code may be allowed to access web site related data the single domain.

In one embodiment, protocol handler module 205 may recognize a code template from a target document for dynamic authentication module 215 to generate a one-time token to authenticate a hyperlink dynamically generated from the code template. The hyperlink may enable linking a block of data stored in sandbox documents 221 with the target document. For example, the dynamic hyperlink may specify a network address addressing the block of data via sandbox server 107 as a path value for SRC property (e.g. src=http://sb.example.com/a?token=1234) in an IFRAME tag. Dynamic authentication module 215 may store the generated token temporarily (e.g. for a limited period of time) in tokens 217. A token may be valid if currently stored in tokens 217.

In one embodiment, sandbox server 107 may verify whether a request received is authenticated for accessing a sandbox document stored in sandbox documents 221 via request verification module 213. Sandbox server 107 may be configured to prohibit unauthenticated requests received in document server 105 from accessing sandbox documents 221. Protocol handler module 209 may extract a token from a received request for request verification module 213 to verify the request. In one embodiment, request verification module 213 may send a verification request with the extracted token to document server 105.

In turn, dynamic authentication module 215 may perform verification operations to determine whether a token received from sandbox server 107 is valid, for example, by querying tokens 217. The token may be verified as valid if a matching token is found in tokens 217. In one embodiment, dynamic authentication module 215 may invalidate the token right after the verification operations on the token. As a result, it can be ensured that the token will not be used a second time. For example, the matching token of the verified token may be removed from tokens 217 as soon as the verification operations, successfully or unsuccessfully, complete. Protocol handler module 209 may serve a sandbox document from sandbox documents 221 for a received request authenticated by document server 105 based on validity of a token extracted from the received request.

Figure 3:
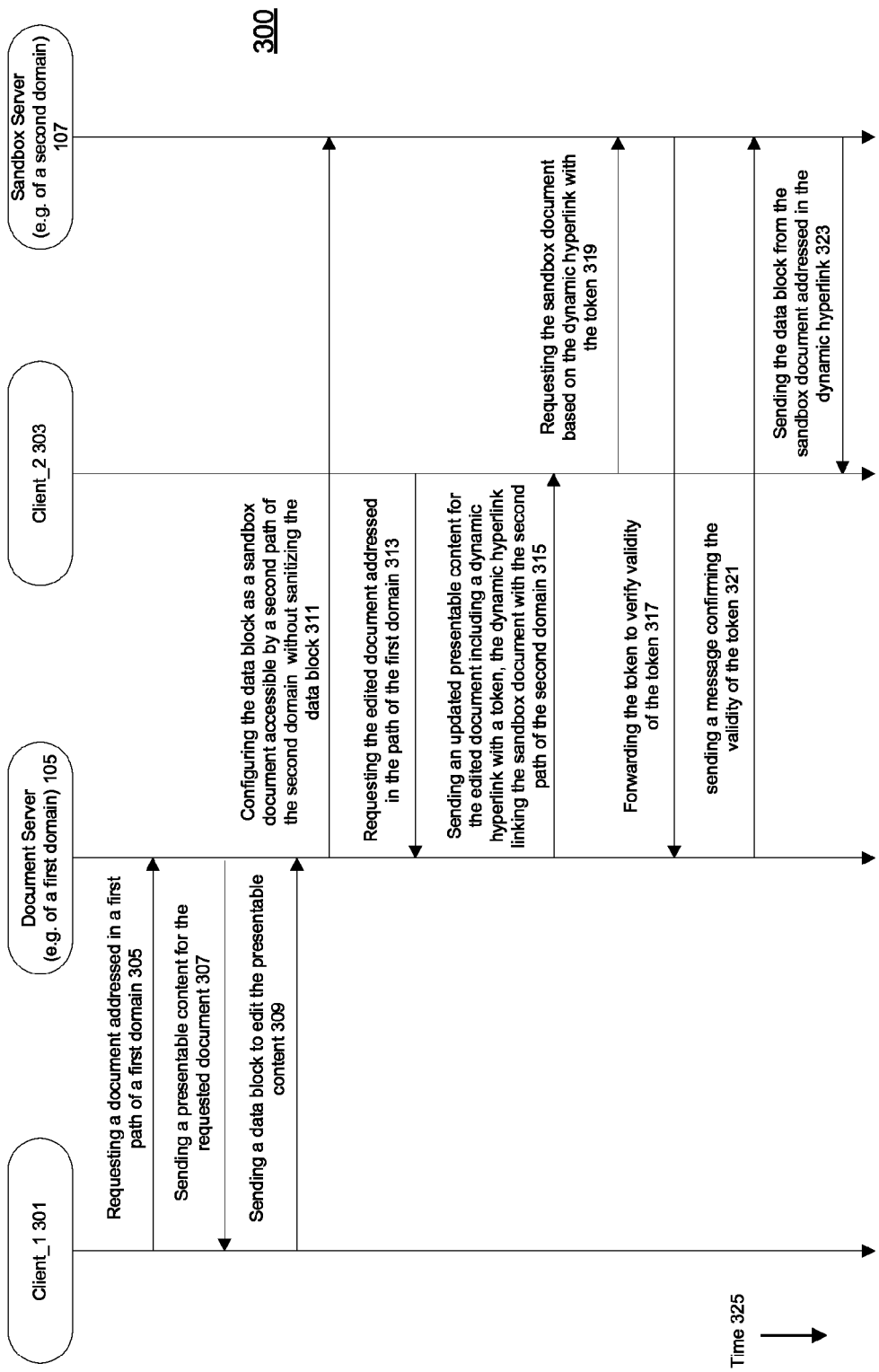
FIG. 3 is a sequence diagram illustrating sample transactions between clients and servers according to one embodiment described herein.

FIG. 3 is a sequence diagram illustrating sample transactions between clients and servers according to one embodiment described herein. In one embodiment, client_1 301 and client_2 303 may be browser or editor applications running in separate client devices, such as client 101 of FIG. 1. Document server 105 and sandbox server 107 may be based on separate server devices or a common server device to serve collaboratively editable documents to clients 301, 303. In one embodiment, document server 105 and sandbox server 107 may be addressable in network addresses registered in separate first and second domains. Separate users of clients 301, 303 may collaboratively edit or access documents addressable through the first domain of document server 105 to cause sequence of transactions 305, 307, ... 323 along time 325.

At sequence 305, in one embodiment, client_1 301 may request a document from document server 105 addressed in a first path of a first domain. The first path may be a URL to locate the document stored in document server 105. In response, document server 105 may send a presentable content for the requested document at sequence 307. The presentable content may be a web page or a hypertext based content (e.g. based on HTML) generated by document server 105 according to the requested document. Client_1 301 may perform edit operations to update the received presentable content with a data block (or a block of data). As a result, at sequence 309, client_1 301 may send the data block to document server 105 with edit instructions or commands for updating the presentable content corresponding to the document addressed by the first path. In one embodiment, client_1 301 may flag the data block to indicate that the data block should be presented as raw content without changes to users requesting updated document addressed by the first path.

At sequence 311, in response to receiving a data block to update a document from client_1 301, document server 105 may configure the data block as a sandbox document accessible by a second path in a second domain of sandbox server 107 without filtering the data block. Document server 105 may determine not to sanitize the data block based on a flag received together with the data block from client_1 301. In one embodiment, document server 105 may directly store the sandbox document to a storage accessible by sandbox server 107, such as sandbox documents 221 of FIG. 2. Alternatively, document server 105 may forward the received data block to sandbox server 107, which stores the data block as a sandbox document.

In one embodiment, client_2 303 may request a document which has been edited by client _1 301 with a data block at sequence 313. The edited document may be accessed via document server 105 using a path of a first domain. In response, at sequence 315, document server 105 may generate an updated presentable content based on the edited document. The updated presentable content may be a web page including a hyperlink dynamically generated with a one-time-use token to link a sandbox document for the data block via sandbox server 107 in a second domain. Document server 105 may send the updated presentable content to client 303.

At sequence 319, client_2 303 may send a request (e.g. an HTTP request) to sandbox server 107 to retrieve a sandbox document addressed in a dynamic hyperlink having a token for authentication. Sandbox server 107, in response to receiving the request with the token, at sequence 317, may forward the token extracted from the request to document server 105 to verify validity of the token. Document server 105 may determine the validity of the received token based on, for example, authentication module 215 of FIG. 2. If the validity of the token is verified, at sequence 321, document server 105 may send a confirmation message to sandbox server 107. Otherwise, document server 105 may send a rejection message to sandbox server 107. In one embodiment, the token may have been invalided in document server 105 when sandbox server 107 receives the confirmation message on the validity of the token. Document server 105 may timely invalidate the token to enforce one-time-use policy on the token. Subsequently at sequence 323, sandbox server 107 may send the sandbox document with the data block uploaded by client_1 301 to client_2 303 as addressed in the dynamic hyperlink if the token is authenticated.

Figure 4:
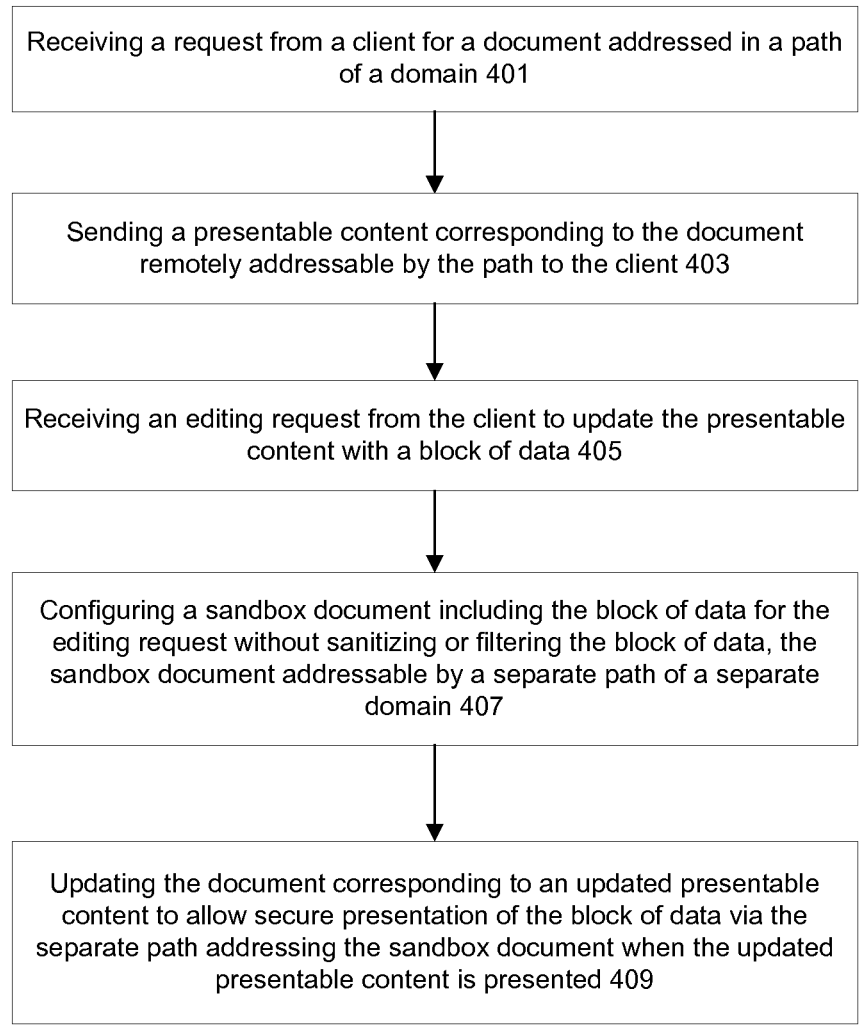
FIG. 4 is a flow diagram illustrating one embodiment of a process to enable collaboratively editing a document with unfiltered data according to one embodiment described herein.

FIG. 4 is a flow diagram illustrating one embodiment of a process to enable collaboratively editing a document with unfiltered data according to one embodiment described herein. Exemplary process 400 may be performed by a processing logic that may comprise hardware (circuitry, dedicated logic, etc.), software (such as is run on a dedicated machine), or a combination of both. For example, process 400 may process 400 may be performed by some components of system 200 of FIG. 2. At block 401, the processing logic of process 400 may receive a request from a client for a document addressed in a path of a domain for editing the document collaboratively with other application clients. At block 403, the processing logic of process 400 may send a presentable content corresponding to the document remotely addressable by the path to the client.

In one embodiment, at block 405, the processing logic of process 400 may receive an editing request (e.g. an HTTP post request) from a client to update a presentable content generated from a document. The editing request may include a block of data to update the document. The processing logic of process 400 may configure a sandbox document including the block of data at block 407. In one embodiment, the processing logic of process 400 may not sanitize or filter the block of data as instructed by the editing request. For ensuring secure presentation, the sandbox document may be configured to be addressable by a separate path of a separate domain. For example, presentation of the sandbox document may be confined in an isolated environment (e.g. browser components of a certain domain) in a client device. As a result, active content of the sandbox document may be prohibited from affecting the device outside the isolated environment. At block 409, the processing logic of process 400 may update the document corresponding to an updated presentable content to allow secure presentation of the block of data via the separate path addressing the sandbox document for the updated presentable content.

Figure 5:
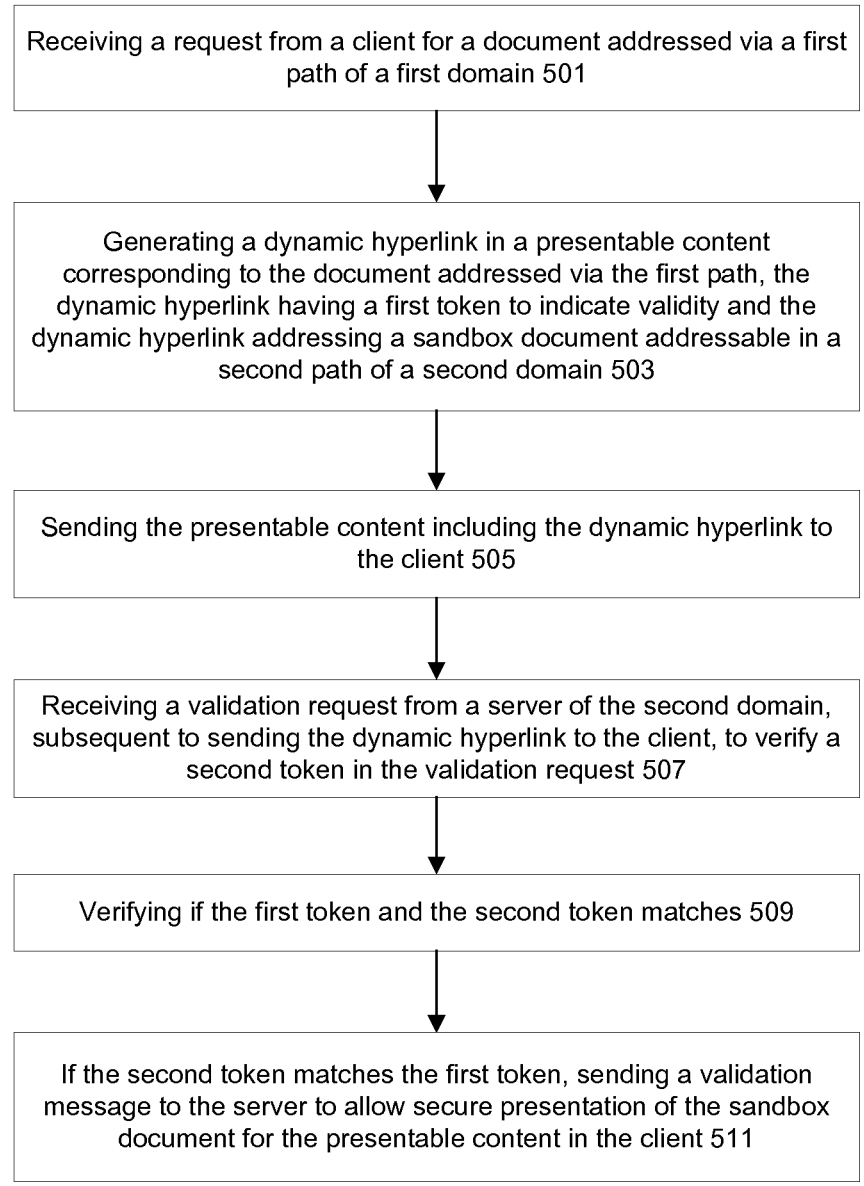
FIG. 5 is a flow diagram illustrating one embodiment of a process to verify a request to restrict access of an external content according to one embodiment described herein.

FIG. 5 is a flow diagram illustrating one embodiment of a process to verify a request to restrict access of an external content according to one embodiment described herein. Exemplary process 500 may be performed by a processing logic that may comprise hardware (circuitry, dedicated logic, etc.), software (such as is run on a dedicated machine), or a combination of both. For example, process 500 may process 500 may be performed by some components of system 200 of FIG. 2. At block 501, the processing logic of process 500 can receive a request from a client for a document addressed via a first path of a first domain, such as domain "wiki.example.com" of document server 105 of FIG. 5. In response, at block 503, the processing logic of process 500 may generate a dynamic hyperlink in a presentable content corresponding to the document addressed. The dynamic hyperlink can embed a first token to indicate that the hyperlink is valid. The hyperlink may include a second path addressing a sandbox document in a second domain.

At block 505, the processing logic of process 500 may send a presentable content, e.g. a web page generated from a document addressed in an HTTP request, including a dynamic hyperlink back to a client requesting the document. At block 507, the processing logic of process 500 may receive a validation request from a separate server of a second domain, such as sandbox server 107 of FIG. 1, addressed in the dynamic hyperlink. The validation request may include a second token extracted from the dynamic hyperlink. In one embodiment, the processing logic of process 500 may verify validity of the second token, for example, based on matching a first token and the second token (e.g. whether the first token and the second token are equal or the same according to a comparison measure based on token values or derived values from the tokens) at block 509. The first token may be stored for generating the dynamic hyperlink. If the second token matches the first token, at block 511, the processing logic of process 500 may send a validation message to the separate server. As a result, the separate server may send the sandbox document to the requesting client to allow secure presentation of the sandbox document for the presentable content in the requesting client.

Figure 6:
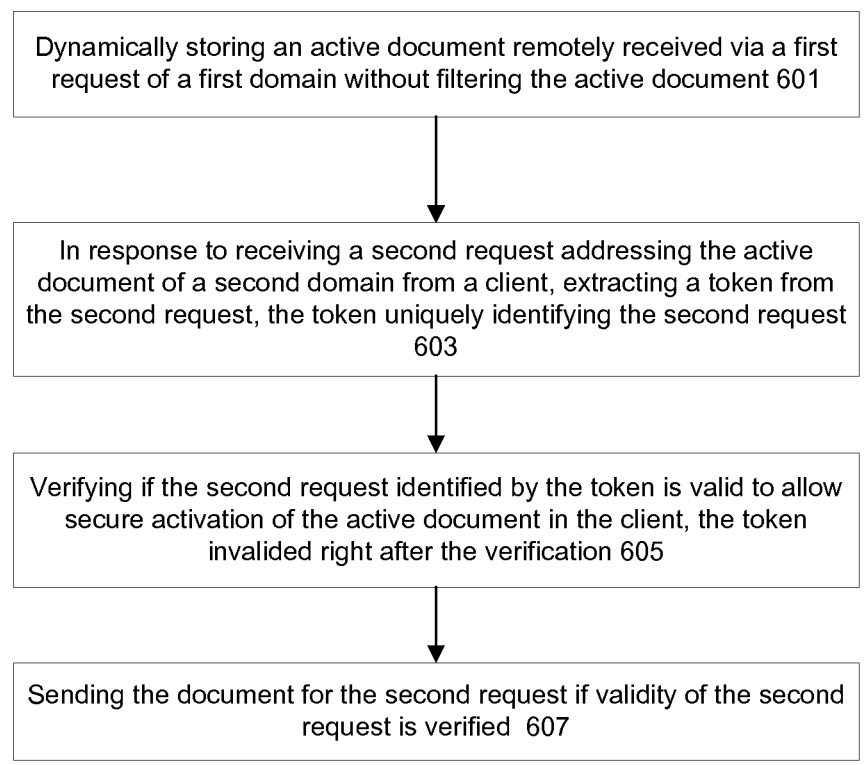
FIG. 6 is a flow diagram illustrating one embodiment of a process to verify a request to allow secure activation of an unfiltered active content according to one embodiment described herein.

FIG. 6 is a flow diagram illustrating one embodiment of a process to verify a request to allow secure activation of an unfiltered active content according to one embodiment described herein. Exemplary process 600 may be performed by a processing logic that may comprise hardware (circuitry, dedicated logic, etc.), software (such as is run on a dedicated machine), or a combination of both. For example, process 600 may process 600 may be performed by some components of system 200 of FIG. 2. An active document may include active content or document content. Active content may include executable code, instructions or commands which may cause a client device to perform operations, such as executing the executable code (e.g. script code, JavaScript code, Jscript code, Java code or other applicable code) or activating a dynamically link library or other binary components according to the executable code.

At block 601, the processing logic of process 600 can dynamically store an active remotely received via a first request of a first domain without filtering the active document. In response to receiving a second request addressing the active document of a second domain from a client, at block 603, the processing logic of process 600 may extract a token from the second request. The extracted token may uniquely identify the second request. At block 605, the processing logic of process 600 may verify if the second request identified by the token is valid to allow secure activation of the active document in the client. The token may be invalided as soon as the verification completes. Subsequently, at block 607, the processing logic of process 600 may send the document for the second request if validity of the second request is verified.

Figure 7:
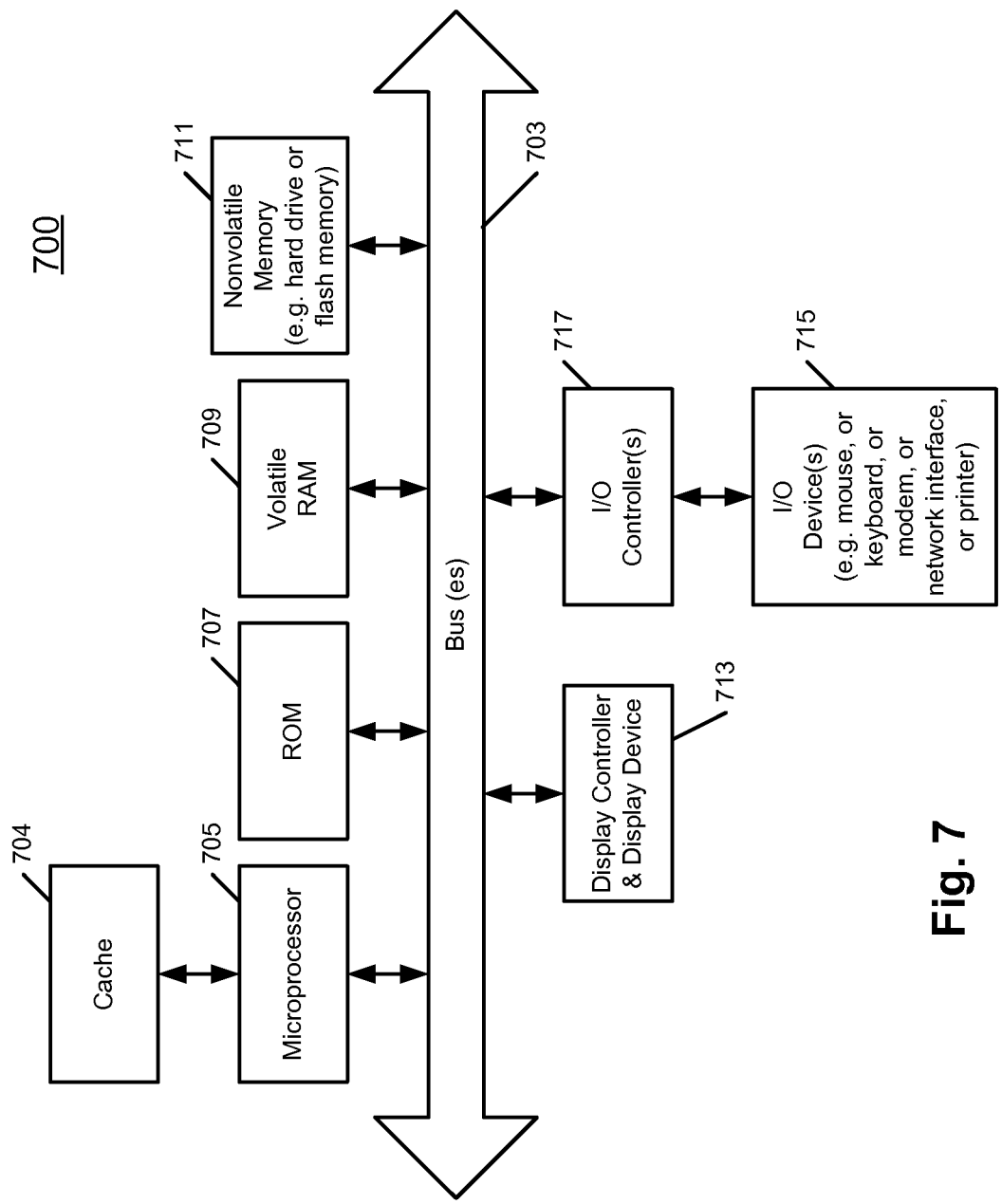
FIG. 7 illustrates one example of a data processing system such as a computer system, which may be used in conjunction with the embodiments described herein.

FIG. 7 shows one example of a data processing system such as a computer system, which may be used with one embodiment in the present invention. For example, the system 700 may be implemented as a part of the system shown in FIG. 1. Note that while FIG. 7 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 7, the computer system 700, which is a form of a data processing system, includes a bus 703 which is coupled to a microprocessor(s) 705 and a ROM (Read Only Memory) 707 and volatile RAM 709 and a non-volatile memory 711. The microprocessor 705 may retrieve the instructions from the memories 707, 709, 711 and execute the instructions to perform operations described above. The bus 703 interconnects these various components together and also interconnects these components 705, 707, 709, and 711 to a display controller and display device 713 and to peripheral devices such as input/output (I/O) devices which may be mice, keyboards, modems, network interfaces, printers and other devices which are well known in the art. Typically, the input/output devices 715 are coupled to the system through input/output controllers 717. The volatile RAM (Random Access Memory) 709 is typically implemented as dynamic RAM (DRAM) which requires power continually in order to refresh or maintain the data in the memory.

The mass storage 711 is typically a magnetic hard drive or a magnetic optical drive or an optical drive or a DVD RAM or a flash memory or other types of memory systems which maintain data (e.g. large amounts of data) even after power is removed from the system. Typically, the mass storage 711 will also be a random access memory although this is not required. While FIG. 7 shows that the mass storage 711 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface or wireless networking interface. The bus 703 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g. an abstract execution environment such as a "virtual machine" (e.g. a Java Virtual Machine), an interpreter, a Common Language Runtime, a high-level language virtual machine, etc.), and/or, electronic circuitry disposed on a semiconductor chip (e.g. "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture may be used to store program code. An article of manufacture that stores program code may be embodied as, but is not limited to, one or more memories (e.g. one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g. a server) to a requesting computer (e.g. a client) by way of data signals embodied in a propagation medium (e.g. via a communication link (e.g. a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A machine-readable non-transitory storage medium having instructions therein, which when executed by a machine, causes the machine to perform a method, the method comprising:

in response to receiving a first request associated with a document, updating the document in a first domain, the updated document associated with a mechanism for secure activation of active content referred to by a hyperlink;

storing the active content in a second domain without filtering the active content;

in response to receiving a subsequent request from a client to retrieve the updated document in the first domain, generating, at a device, a one time token uniquely for the subsequent request, the one time token to authorize an access to the active content of the second domain via a hyperlink having the one time token;

sending the updated document modified with the hyperlink having the one time token to the client, the active content accessible via the hyperlink having the one time token when the client presents the updated document;

in response to receiving a second request addressing the active content of the second domain, extracting a token from the second request, the token dynamically generated for a request to retrieve the updated document in the first domain;

verifying, at the device, whether the second request is valid using the token extracted from the second request, the second request being valid when the token matches the one time token; and sending the active content for the second request if validity of the second request is verified based on the token to allow the secure activation of the active content in the updated document.

2. The medium of claim 1, wherein the verification comprises:

sending a verification request to a server, the verification request including the token; and receiving a verification response from the server, the verification response indicating whether the token is valid, wherein the first request was received by the server and wherein the token is valid if the server generated the token for the second request.

3. The medium of claim 2, wherein the document is a hypertext document, wherein the server stores the active content and wherein the request is based on the hypertext document served by the server to prohibit presentation of the active content outside of the hypertext document.

4. The medium of claim 2, wherein the verification request causes the token to be invalidated if the verification response indicates the token is valid.

5. The medium of claim 1, wherein the active content is stored in the second domain as a sandbox document for the secure activation via the updated document of the first domain.

6. The medium of claim 5, wherein the updated document includes a code and wherein the hyperlink having the one time token is generated according to the code.

7. The medium of claim 6, wherein the update of the document comprises:

generating the code according to the first request; and inserting the code into the document, wherein the code specifies a path addressing the sandbox document in the second domain.

8. The medium of claim 7, wherein the code is a server side script code, wherein the script code is executed to generate the hyperlink with the one time token in response to the subsequent request.

9. The medium of claim 1, wherein the generation of the one time token comprises:

storing the one time token in a storage area, wherein the one time token is invalidated from the storage area after a limited period of time.

10. The medium of claim 9, wherein the one time token is identified from the storage area for validity verification and wherein the one time token is invalidated from the storage area substantially when the one time token is identified to prohibit the one time token from being used for validity verification more than once.

11. The medium of claim 1, wherein the updated document includes a frame element associated with the hyperlink with the one time token.

12. A computer machine coupled with a storage device comprising:

the computer machine configured to:

in response to receiving a first request associated with a document, update the document in a first domain, the updated document associated with a mechanism for secure activation of active content referred to by a hyperlink;

store the active content in a second domain in the storage device without filtering the active content;

in response to receiving a subsequent request from a client to retrieve the updated document in the first domain, generate, at a device, a one time token uniquely for the subsequent request, the one time token to authorize an access to the active content of the second domain via a hyperlink having the one time token;

send the updated document modified with the hyperlink having the one time token to the client, the active content accessible via the hyperlink having the one time token when the client presents the updated document;

in response to receiving a second request addressing the active content of the second domain, extract a token from the second request, the token dynamically generated for a request to retrieve the updated document in the first domain;

verify, at the device, whether the second request is valid using the token extracted from the second request, the second request being valid when the token matches the one time token; and send the active content for the second request when validity of the second request is verified based on the token to allow the secure activation of the active content in the updated document.

13. A computer system comprising:

a memory storing executable instructions to allow cooperative edit of a document remotely addressable by a path of a domain;

a storage device storing the document; and a hardware processor coupled to the memory and the storage device to execute the instructions from the memory, the hardware processor being configured to send to a client the document, in response to receiving an editing request from the client for the edit of the document, configure a sandbox document to update the document in the storage device, the sandbox document addressable by a separate path of a separate domain, the editing request including a block of data and the sandbox document including the block of data, the updated document to allow secure presentation of the block of data via the sandbox document, in response to receiving a first request from a separate client to retrieve the updated document of the domain, generate a one time token uniquely for the first request, the one time token to authorize an access to the sandbox document of the separate domain via a hyperlink having the one time token, send the updated document, modified with the hyperlink, to the separate client for the access to the sandbox document via the hyperlink, in response to receiving a token from the separate domain, verify whether the token received matches the one time token, the access to the sandbox document of the separate domain being authorized for the secure presentation of the block of data when the token received matches the one time token.

\* \* \* \* \*

UNITED STATES PATENT AND TRADEMARK OFFICE
CERTIFICATE OF CORRECTION

| | | |
|---|---|---|
| PATENT NO. | : 9,098,719 B2 | Page 1 of 1 |
| APPLICATION NO. | : 13/020755 | |
| DATED | : August 4, 2015 | |
| INVENTOR(S) | : John Aaron Anderson and Andrew John Nesbitt | |

It is certified that error appears in the above-identified patent and that said Letters Patent is hereby corrected as shown below:

On the title page, item (54), please replace "UNRUSTED" with --UNTRUSTED--.

Signed and Sealed this
Twenty-third Day of February, 2016

Michelle K. Lee
*Director of the United States Patent and Trademark Office*

UNITED STATES PATENT AND TRADEMARK OFFICE
CERTIFICATE OF CORRECTION

PATENT NO. : 9,098,719 B2  
APPLICATION NO. : 13/020755  
DATED : August 4, 2015  
INVENTOR(S) : John Aaron Anderson and Andrew John Nesbitt Page 1 of 1

It is certified that error appears in the above-identified patent and that said Letters Patent is hereby corrected as shown below:

On the title page, item (54), and in the specification, col. 1, line 1, please replace "UNRUSTED" with --UNTRUSTED--.

This certificate supersedes the Certificate of Correction issued February 23, 2016.

Signed and Sealed this
Fourteenth Day of June, 2016

Michelle K. Lee
*Director of the United States Patent and Trademark Office*